July 23, 1929.　　　F. A. LUKESH　　　1,722,227
CONVERTIBLE MOTOR VEHICLE
Filed May 18, 1928　　2 Sheets-Sheet 1

FRED A. LUKESH, INVENTOR
BY Victor J. Evans, ATTORNEY

July 23, 1929.  F. A. LUKESH  1,722,227
CONVERTIBLE MOTOR VEHICLE
Filed May 18, 1928  2 Sheets-Sheet 2
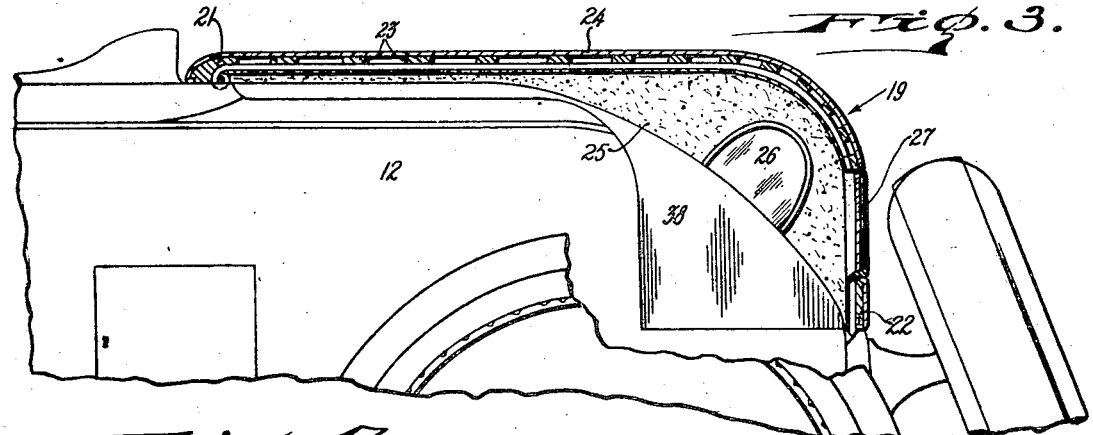
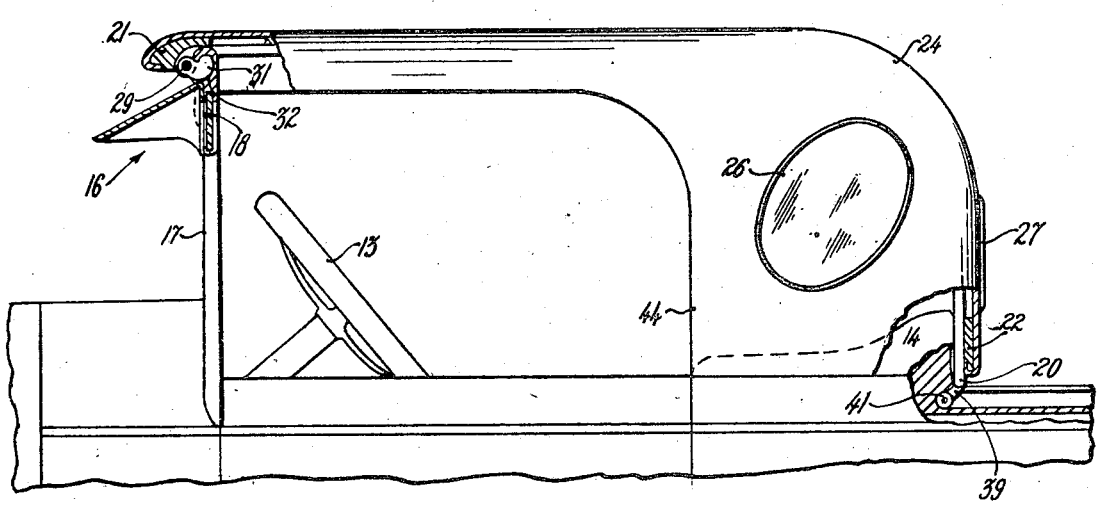
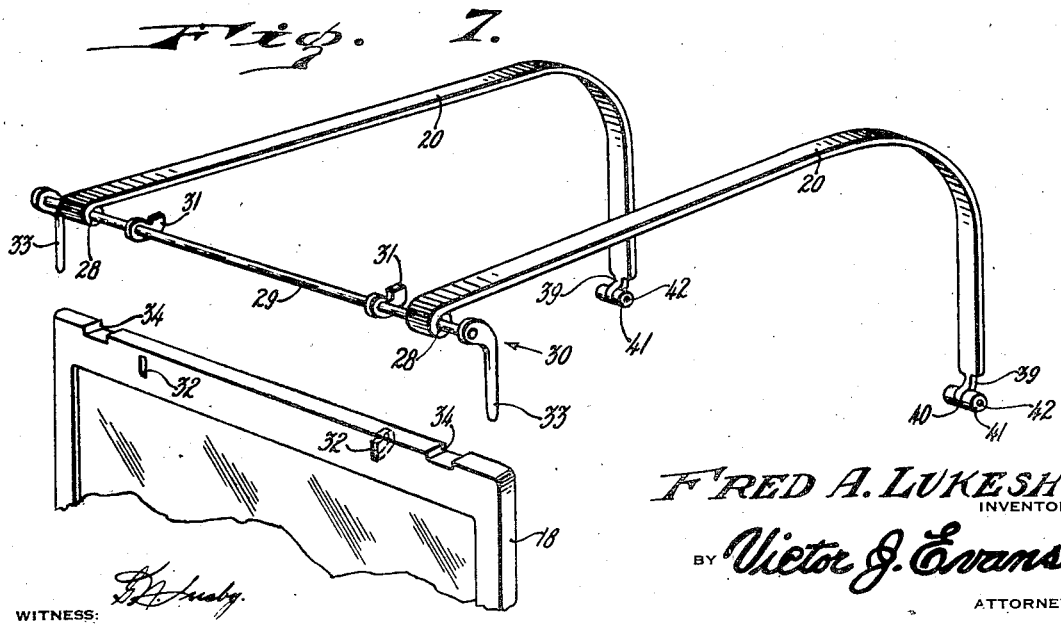
FRED A. LUKESH, INVENTOR
BY Victor J. Evans, ATTORNEY Patented July 23, 1929.

1,722,227

UNITED STATES PATENT OFFICE.

FRED A. LUKESH, OF BROOKLYN, NEW YORK.

CONVERTIBLE MOTOR VEHICLE.

Application filed May 18, 1928. Serial No. 278,829.

This invention relates to convertible motor vehicles, and particularly to a motor vehicle that may be changed from one type, such as a closed coupé, to different type, such as an open roadster.

The primary object of the invention is the provision of an automobile that may be readily changed by a person therein, without the use of implements, from a coupé to a roadster, or vice versa.

Heretofore foldable tops have been closed and swung into position, necessitating tying of the top on the rear of the body and detracting from the appearance of the car, as well as becoming a source of trouble by collecting dust.

Another object of this invention is the provision of means whereby the rigid top of a motor vehicle may be moved as a whole, preferably by rolling contact of the base of the top and the upper part of the body of the vehicle, between an elevated forward position and a lowered rear position, the neat appearance of the car being maintained in both positions.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 3 is a longitudinal vertical section of the top in lowered position.

Figure 4 is a side elevation, partly section, of the top in a forward, elevated position.

Figure 7 is a perspective view of a portion of the windshield, showing also the locking rod in separated relation thereto.

Figure 1:
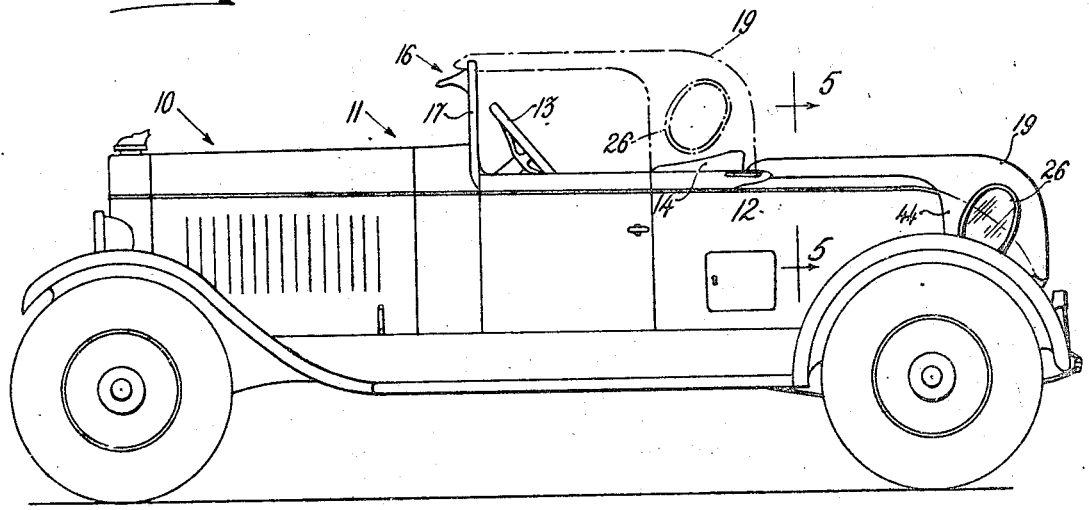
Figure 1 is a side elevation of an automobile with my invention applied thereto, the hood or top being in the rear, lowered position and indicated in dot and dash lines in the forward elevated position.
Figure 2:
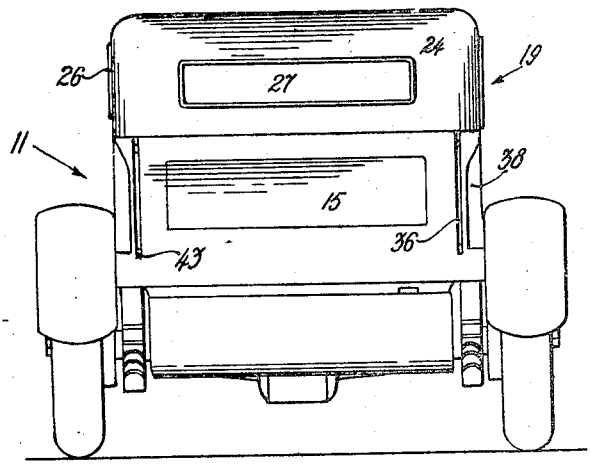
Figure 2 is a rear view of the automobile and associated invention.
Figure 6:
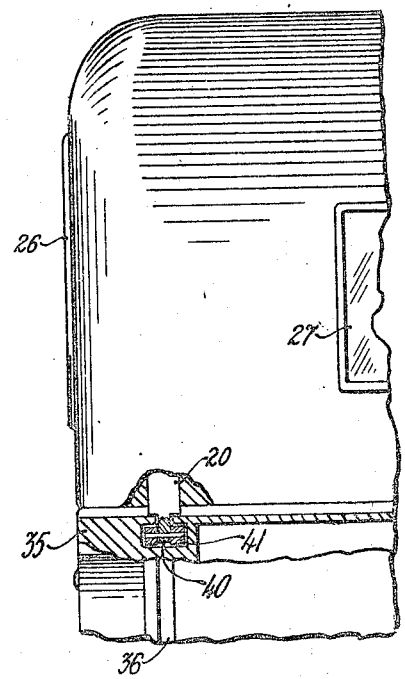
Figure 6 is a fragmentary rear view, partly sectional.
Figure 5:
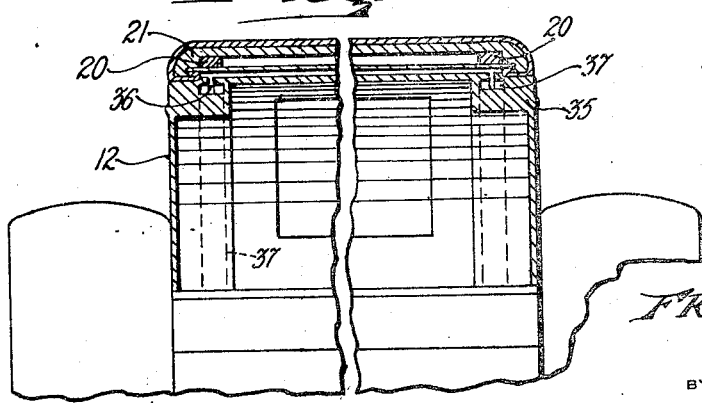
Figure 5 is a section on the line 5—5 of Figure 1.

Referring more particularly to the drawings, an automobile represented in its entirety by the numeral 10 comprises a body 11 having a rear end 12, a steering wheel 13 and adjacent thereto seating means 14. Said rear end, as at 15, may also have seating means therein, if desired. A windshield unit 16 forward of the seating means includes supporting posts 17 and a frame 18.

The top 19 comprises longitudinal L-shaped spars 20 to which front and rear cross pieces 21, 22 are attached. Cross ribs 23 are carried by said spars and support the outer covering 24, a lining 25 being provided on the inside thereof. Appropriate window openings 26, 27 are provided in the side and rear walls of the top.

It will be noted that the forward part of the spars 20 are horizontally disposed, and that their rear ends curve downwardly to conform approximately with the outline of the rear end 12 of the body. The forward ends of said spars are provided with eyes 28 to serve as a bearing for the rod 29 of a locking means 30. Rigid with the rod are a pair of locking dogs or catches 31 which are adapted to fit in appropriate recess 32 in the frame of the windshield, thereby providing means for locking the top on manipulation of handles 33, which are rigidly attached to the ends of the rod 29. It will be noted that the relative positions of the catches and handles are such as to insure an automatic grip of the former by the gravitational weight of the latter when said catches are in their grooves. Notches 34 in the windshield accommodate the spars 20.

Along each side of the rear body part 12 there are parallel portions 35 having therein longitudinal grooves 36 above channels 37, while a recess 38 is provided in each side of said part 12. Reduced portions 39 at the rear ends of the spars 20 are adapted for movement in said grooves, while said channels accommodate rollers 41, the latter being free to rotate on pins 42 fast within the bearings 40 in the ends of the spars.

By moving either of the handles 33 forwardly, an occupant of the car partially rotates the rod 29 and unlocks the catches, whereupon the front of the top may be raised slightly and said hood moved rearwardly to the lowered position, where the reduced portions 39 contact with the terminals 43 of the grooves 36. The top then rests snugly on the body 12, with its side walls 44 fitting in the respective recess 38.

With the top 19 in position above the seating means 14, the car may be termed a coupé, and it is thought that it will be seen that, with said top lowered on the rear part 12 of the body, the car takes the form of a roadster without detracting from the artistic appearances of the same.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In an automobile body having a slidably mounted top, a wind shield having recesses therein, latch mechanism for detachably connecting the windshield and said top, said latch mechanism including a rod journalled transversely in said top, manipulating members rigid with the ends of said rod, and locking dogs rigid with said rod for reception in said recesses.

2. In a vehicle body having a windshield provided with recesses in the frame thereof, a top slidably mounted upon said body for movement to a position into engagement with said windshield, a transverse rod journalled in said top adjacent the forward end thereof, hook catch members fixedly mounted on said rod for locking reception within said recesses, and manipulating handle members fixed to opposite ends of said rod and accessible by an operator within the body by which said rod may be manually turned to move said hook catch members into and out of said recesses.

In testimony whereof I have affixed my signature.

FRED A. LUKESH.